2 Sheets—Sheet 1.
A. B. SMITH.
CHUCKS FOR METAL LATHES.
No. 181,369. Patented Aug. 22, 1876.
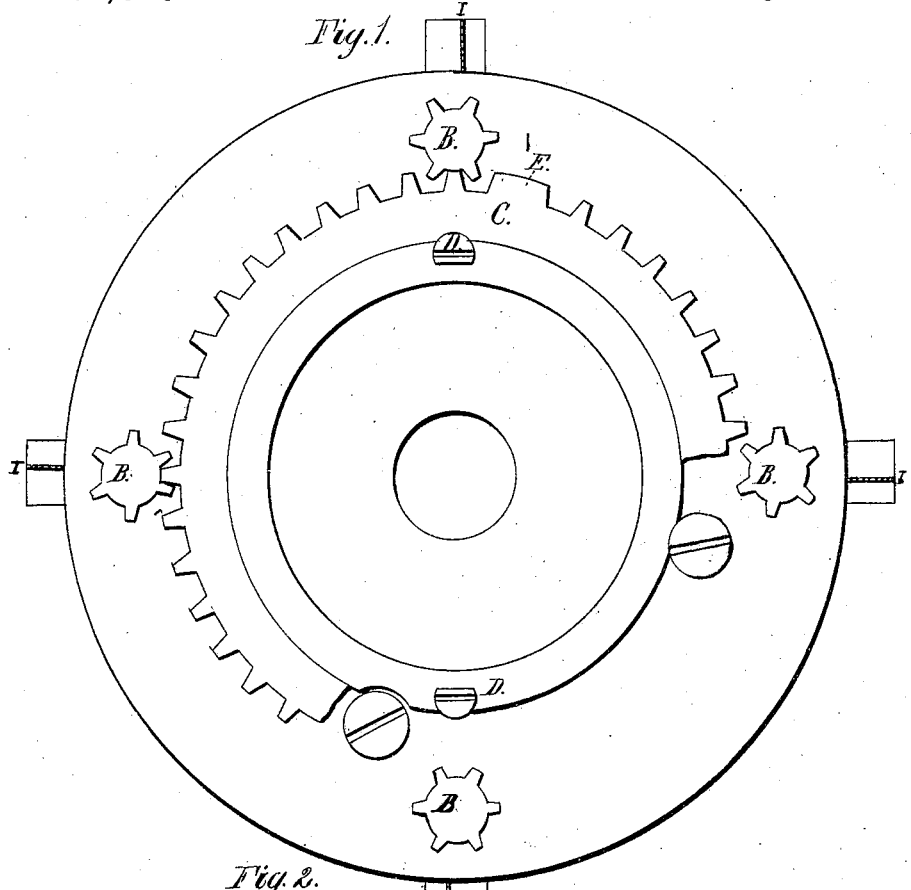
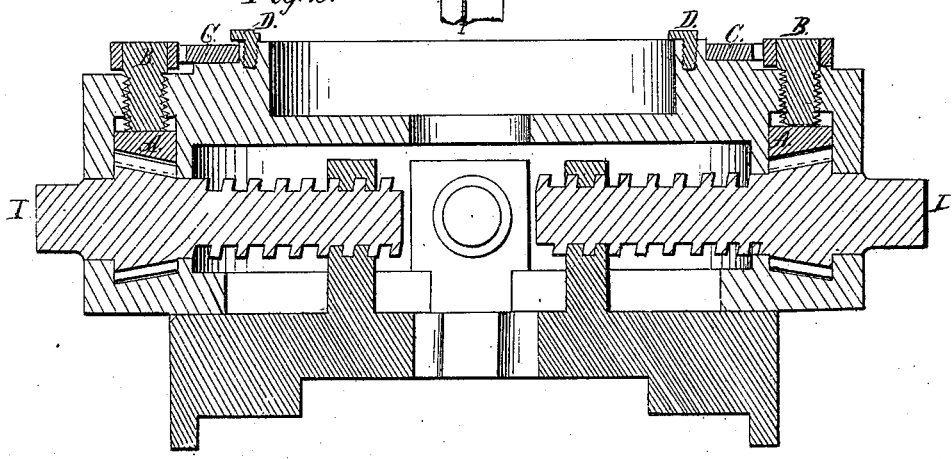
Attest: Inventor:

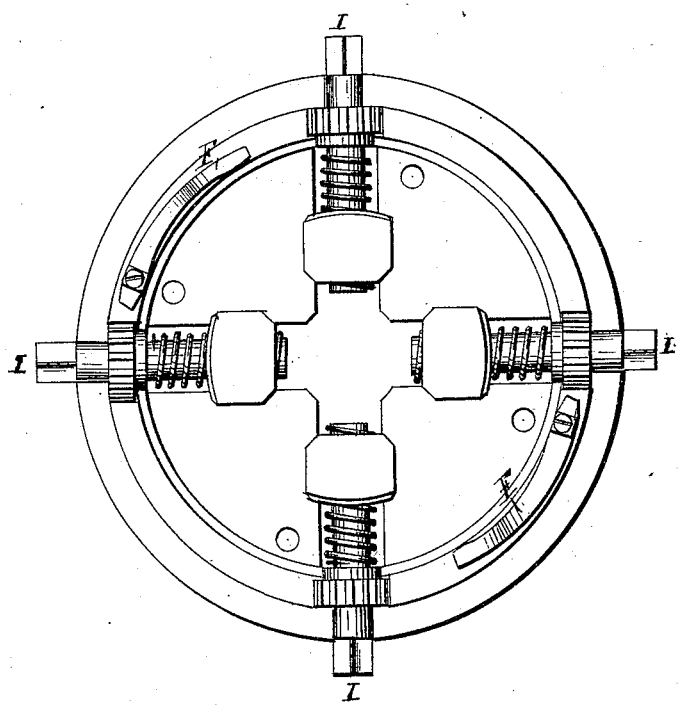

UNITED STATES PATENT OFFICE.

ANSELMO B. SMITH, OF DENVER, COLORADO TERRITORY.

IMPROVEMENT IN CHUCKS FOR METAL-LATHES.

Specification forming part of Letters Patent No. 181,369, dated August 22, 1876; application filed June 24, 1876.

*To all whom it may concern:*

Be it known that I, ANSELMO B. SMITH, of Denver, Colorado, have invented a new and useful Improvement in Chucks for Metal-Lathes, of which the following is a specification:

The object of my invention is to provide a chuck that can be used as a universal, independent, concentric or eccentric chuck, and that can readily be changed from one of these to the other.

My invention consists of the combination and arrangement of the several parts, as hereinafter described, and specifically pointed out in the claims.

Referring to the accompanying drawings, Figure 1 is a plan view of the rear side of the chuck, showing the toothed ring for operating the pinion-headed screws B. Fig. 2 is a cross-section of my improved chuck; and Fig. 3, a plan view of the under side of the jaw-carrying part of the same, showing the springs for throwing the ring for operating the pinions on the jaw-screws out of gear.

My invention is an improvement upon the chuck patented to Eli Horton, November 13, 1855, No. 13,787, and a detailed description of the several parts common to both chucks is, therefore, unnecessary.

B represents the gear-headed screws, which throw the toothed ring A into gear with the pinions of the jaw-screw. C is a toothed ring, which is used for turning all of the gear-headed screws B at once, and it is held in place by means of the screws D, each of which has one side of its head cut away, so that, by turning it half-way around, the toothed ring C can be readily removed, to enable the gear-headed screws B to be properly adjusted. The ring C in the drawing, Fig. 1, is cut away to show the location of the bolts for holding the two halves of the chuck together. I represents an index formed on one of the corners of the square end of each jaw-screw. A corresponding index is formed on the edge of the face-plate over each squared end, in virtue of which all of the jaws can be properly positioned, each at an equal distance from the center, by turning, by means of a wrench applied to the squared ends, each jaw-screw until its index-corner is directly under the index upon the edge of the face-plate. The face-plate is also divided by circles, which are of the same distance apart as are the threads of the jaw-screws; and these circles are also of service in approximating the position of the jaws. A jaw might be set nearly accurate by these circles, but by the aid of the index I there can be no mistake when the chuck has once been properly indexed. The blank space just above the toothed ring A (being about one-tenth ($\frac{1}{10}$) of an inch) shows the whole extent that I increase the bulk of the chuck. Attached to the frame of the jaw-holding half of the chuck between the jaw-screws are the springs F, (see Fig. 3,) which bear directly upon the face of the cogs of ring A, and not only serve to throw the said ring out of gear with the pinions of the jaw-screws when the gear-headed screws B are turned back, but also prevent it from rattling when the device is employed as an independent chuck.

When used as a universal chuck the toothed ring A moves with much less friction on the ends of the gear-headed screws B than when it wears all the way around the chuck, as in all other chucks of this class.

The geared ring C has a blank-cog, E, which prevents the gear-headed screws B from being turned too far in or out.

I claim and desire to secure by Letters Patent—

1. The combination of the pinions of the jaw-screws, provided with square indexed ends I, toothed ring A, springs F, and screws B, substantially as described.

2. The combination of the gear-headed screws B and the rings A C, substantially as described.

ANSELMO B. SMITH.

Witnesses:
A. M. SMITH,
D. P. COWL.